United States Patent
Dykes

(10) Patent No.: US 7,978,460 B2
(45) Date of Patent: Jul. 12, 2011

(54) GENERATOR SET HAVING TWO-PIECE TERMINAL BOX

(75) Inventor: James E. Dykes, Meansville, GA (US)

(73) Assignee: Caterpillar Inc., Peoria, IL (US)

( * ) Notice: Subject to any disclaimer, the term of this patent is extended or adjusted under 35 U.S.C. 154(b) by 433 days.

(21) Appl. No.: 12/289,317

(22) Filed: Oct. 24, 2008

(65) Prior Publication Data

US 2010/0102684 A1    Apr. 29, 2010

(51) Int. Cl.
    *H02B 1/26* (2006.01)

(52) U.S. Cl. ....... 361/641; 174/50.25; 174/59; 361/643; 361/648; 361/658; 439/76.2

(58) Field of Classification Search ................. 361/622, 361/624, 627, 641, 643, 648, 649, 650, 658
    See application file for complete search history.

(56) References Cited

U.S. PATENT DOCUMENTS

| | | | |
|---|---|---|---|
| 3,175,125 A | 3/1965 | Brown et al. | |
| 3,489,911 A | 1/1970 | Varner et al. | |
| 4,249,227 A | 2/1981 | Kato et al. | |
| 4,429,242 A * | 1/1984 | Layh | 310/71 |
| 5,665,939 A * | 9/1997 | Jorgensen et al. | 174/50.52 |
| 5,715,135 A * | 2/1998 | Brussalis et al. | 361/624 |
| 5,788,529 A | 8/1998 | Borzi et al. | |
| 6,191,948 B1 | 2/2001 | Beyer | |
| 6,664,678 B2 * | 12/2003 | Shimizu | 310/71 |
| 6,785,139 B2 * | 8/2004 | Onizuka et al. | 361/704 |
| 6,873,510 B2 | 3/2005 | Schomaker et al. | |
| 6,926,545 B2 | 8/2005 | Fukamachi et al. | |
| 7,365,964 B2 | 4/2008 | Donahue, IV | |
| 2003/0011258 A1 | 1/2003 | Kern et al. | |
| 2004/0074089 A1* | 4/2004 | Gilleo | 29/832 |
| 2005/0013095 A1* | 1/2005 | Oda | 361/601 |
| 2005/0116475 A1 | 6/2005 | Hibi et al. | |
| 2006/0119104 A1 | 6/2006 | Wall | |
| 2007/0296281 A1* | 12/2007 | Choi | 310/12 |
| 2008/0185801 A1 | 8/2008 | Gravlin et al. | |

* cited by examiner

*Primary Examiner* — Gregory D Thompson
(74) *Attorney, Agent, or Firm* — Finnegan, Henderson, Farabow, Garrett & Dunner LLP

(57) ABSTRACT

A terminal box for a use with a generator set is provided. The terminal box may have a customer connection, a first housing piece configured to be mounted proximate a generator of the generator set, and at least one cable housed within the first housing piece to electrically connect the generator with the customer connection. The terminal box may also have a second housing piece mounted to the first housing piece distal the generator, and at least one control component housed within the second housing piece to regulate a characteristic of electrical power produced by the generator.

20 Claims, 4 Drawing Sheets

US 7,978,460 B2

GENERATOR SET HAVING TWO-PIECE TERMINAL BOX

TECHNICAL FIELD

The present disclosure is directed to a generator set and, more particularly, to a generator set having a two-piece terminal box.

BACKGROUND

A generator set includes a combination of a generator and a prime mover, for example a combustion engine. The generator and the prime mover are mounted together along with other accessories on an anchor platform to form an integral unit commonly termed a genset. As fuel is burned within the prime mover, a mechanical rotation is created that drives the generator to produce electrical power. A terminal box is typically included within the genset and houses electronics used to monitor and control genset operation such that the electrical power is produced in a desired manner to have particular characteristics. For example, the terminal box may house a voltage regulator, a fuel governor, a load sharing control, and a remote announciator. A customer connection point including, for example, bus bars and circuit breakers, is also housed within the terminal box for electrically connecting an external load to the genset.

Historically, the terminal box has been a one-piece unit, with electrical load connection components located in a lower half thereof (i.e., proximate the generator), and monitoring and control components located in an upper half thereof (i.e., distal the generator). To save time during manufacture of the genset, the terminal box is usually preassembled and then connected to the generator by way of heavy transmission cables and control lines. Although effective, this arrangement can also be problematic during assembly. That is, during assembly, a technician must reach down through the upper half of the terminal box to make the required electrical connections at the lower half. And, the control components being located in the upper half of the terminal box, combined with a distance away from the connection points and a stiffness of the cables, make the task difficult for the technician to complete. Thus, a terminal box that improves assembly is desired.

An example of a genset having a terminal box modified to improve assembly is disclosed in U.S. Pat. No. 3,489,911 (the '911 patent) issued to Varner et al. on Dec. 26, 1967. In particular, the '911 patent discloses an electric power set (genset) having a control cabinet (terminal box) for mounting instrument panels. All of the instrument panels are of the same configuration so that they can be readily interchanged to different positions within the control cabinet. In this manner, whether the electric power set is located in a pit, a corner, next to a wall, or between other equipment, the instrument panels can be moved during assembly to be visible and accessible when the set is operating.

Although the '911 patent may improve assembly of a genset within an application by providing interchangeable instrument panels, the location of the panels within the control cabinet and the configuration of the control cabinet itself may still be problematic. That is, the '911 patent may do little to improve assembly of the control cabinet to the electric power set.

SUMMARY

In one aspect, the disclosure is directed toward a terminal box for a generator set. The terminal box may include a customer connection, a first housing piece configured to be mounted proximate a generator of the generator set, and at least one cable housed within the first housing piece to electrically connect the generator with the customer connection. The terminal box may also include a second housing piece mounted to the first housing piece distal the generator, and at least one control component housed within the second housing piece to regulate a characteristic of electrical power produced by the generator.

In another aspect, the disclosure is directed toward a method of assembling a terminal box to a generator set. The method may include mounting a first housing piece proximate a generator, and electrically connecting the generator to a customer connection within the first housing piece. The method may also include mounting a second housing piece to the first housing piece after the step of electrically connecting, and electrically connecting a control component within the second housing piece to a component within the first housing piece.

In yet another aspect, the disclosure is directed toward a generator set. The generator set may include a prime mover, a generator configured to be driven by the prime mover to create electrical power, and an anchor platform connecting the prime mover to the generator. The generator set may also include a customer connection, and a terminal box configured to transmit the electrical power to the customer connection and to regulate the creation of electrical power. The terminal box may have a first housing piece operatively mounted to the anchor platform, a breaker housed within the first housing piece, and at least a first cable housed within the first housing piece to electrically connect the generator with the breaker. The terminal box may also have at least a second cable housed within the first housing piece to electrically connect the breaker with the customer connection, a second housing piece mounted to the first housing piece, and at least one control component housed within the second housing piece to regulate a characteristic of electrical power produced by the generator.

DETAILED DESCRIPTION

Figure 1:
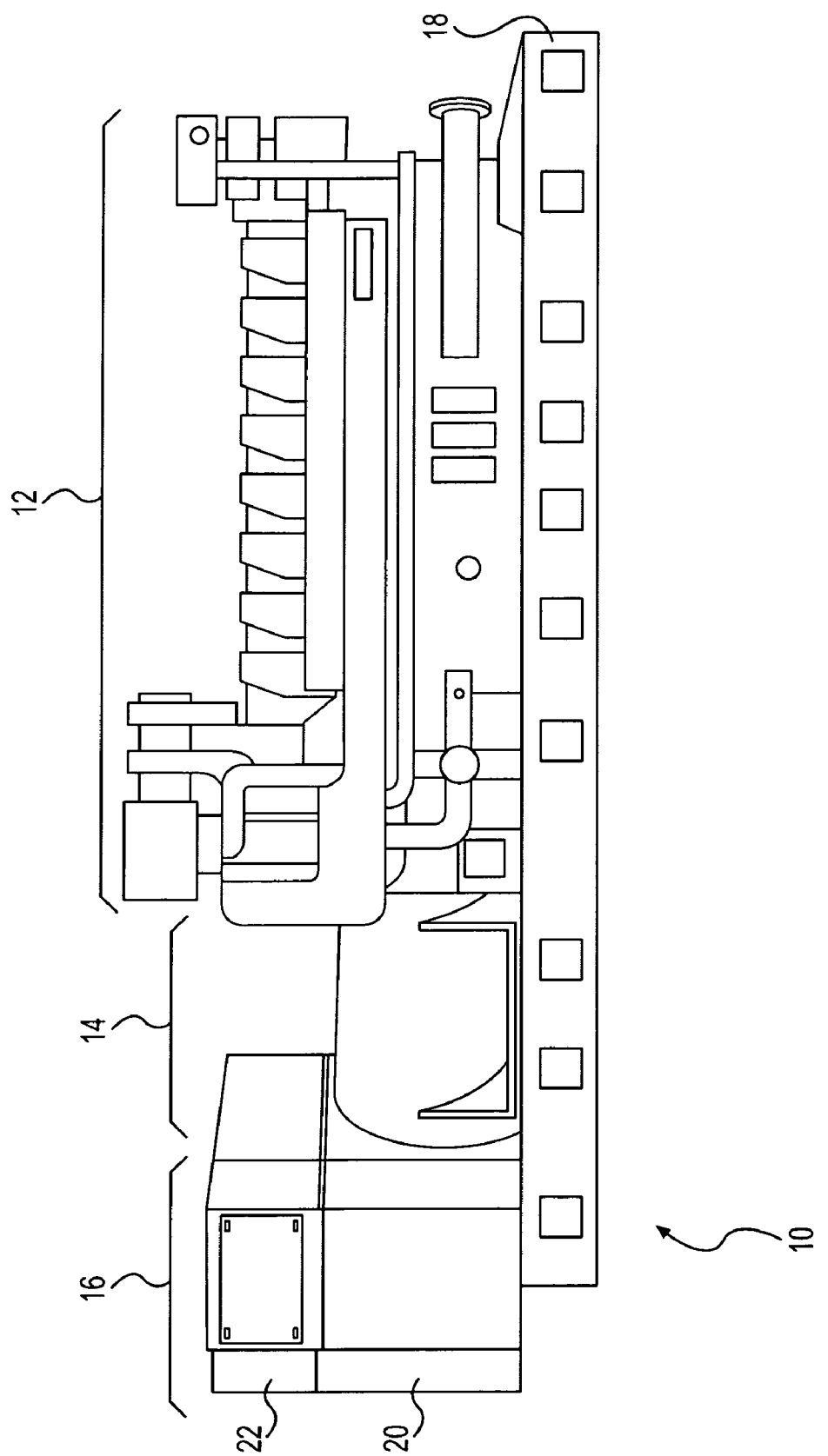
FIG. 1 is a pictorial illustration of an exemplary disclosed generator set.

FIG. 1 illustrates a generator set (genset) 10 having a prime mover 12 coupled to mechanically rotate a generator 14. For the purposes of this disclosure, prime mover 12 is depicted and described as a heat engine, for example, a combustion engine that combusts a mixture of fuel and air to produce the mechanical rotation. One skilled in the art will recognize that prime mover 12 may be any type of combustion engine such as, for example, a diesel engine, a gasoline engine, or a gaseous fuel-powered engine. Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of 50 and/or 60 Hz. Electrical power produced by generator 14 may be directed for offboard purposes by way of one or more generator bus bars 17 (shown only in FIG. 4). Prime mover 12 and generator 14 may each be rigidly mounted to an anchor platform or rails 18 (only one shown in FIG. 1).

Genset 10 may also include a terminal box 16 mounted to rails 18 and in communication with prime mover 12 and/or generator 14 to monitor and regulate an electrical output of genset 10. In one embodiment, terminal box 16 may be a two piece enclosure fabricated from stamped sheet metal that houses one or more electrical connection components separate from one or more monitoring or control components. Specifically, terminal box 16 may include a first housing piece 20 and a second housing piece 22. First housing piece 20 may mount to rails 18 proximate generator 14, while second housing piece 22 may mount directly to first housing piece 20 and distal generator 14.

Figure 2:
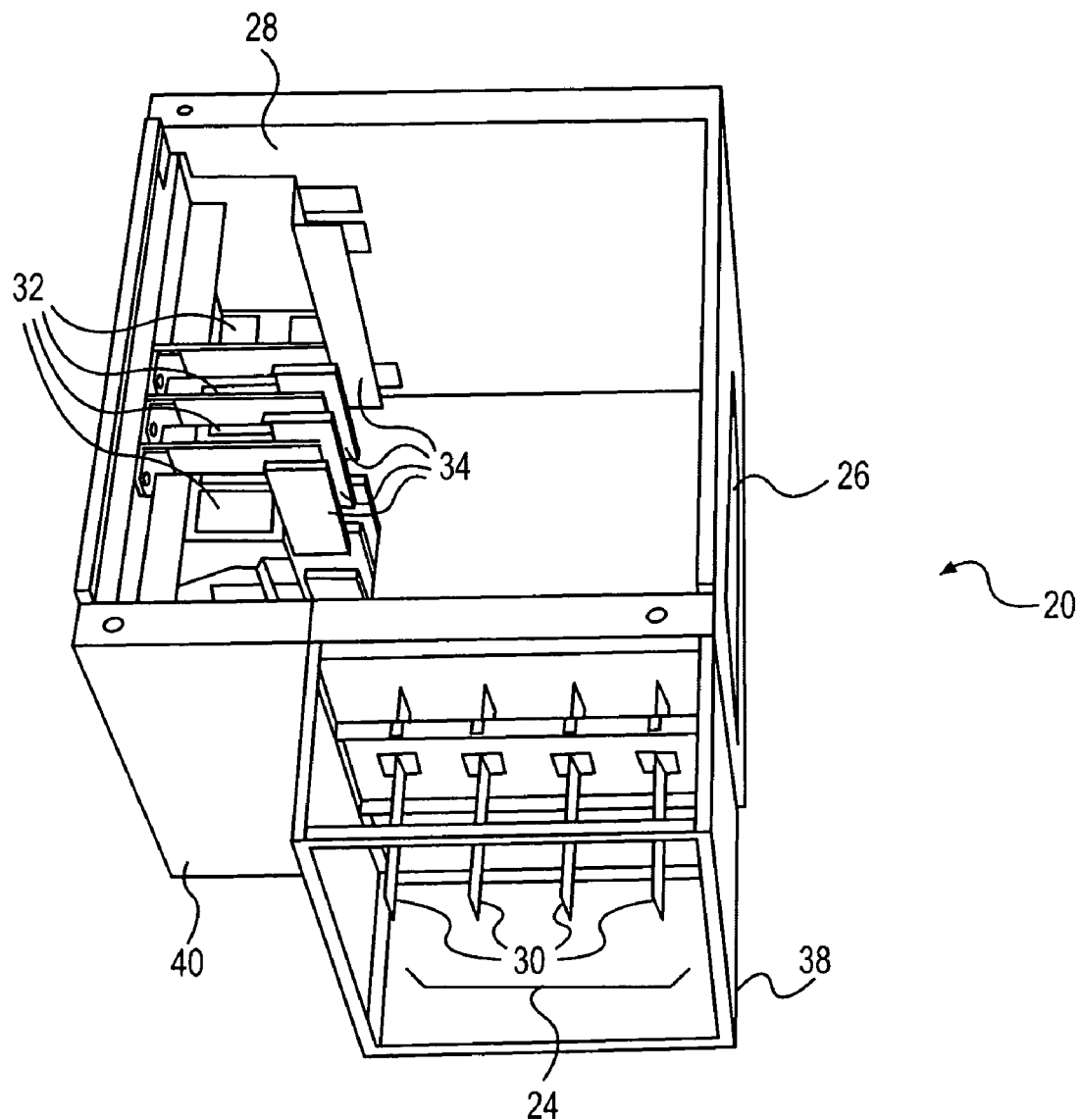
FIG. 2 is a pictorial illustration of an exemplary disclosed terminal box piece that may be used with the generator set of FIG. 1.

As shown in FIG. 2, first housing piece 20 may embody a generally open structural member configured to receive generator 14 and having a customer connection 24 mounted therein to facilitate the transmission of power from generator 14 to an external customer load (not shown). In particular, first housing piece 20 may include an opening 26 at one side to receive at least an end portion of generator 14, and an assembly access opening 28 at an adjacent side to which second housing piece 22 mounts. Assembly access opening 28 may be oriented generally upward with respect to gravity and be substantially blocked by second housing piece 22 after complete assembly of terminal box 16. In one embodiment, customer connection 24 may embody one or more bus bars 30 to which a user of genset 10 (i.e., a customer) may connect the external load to receive power. The electrical connection components may include, among other things, one or more breakers 32 and a plurality of associated breaker bus bars 34. A plurality of cables 36 (shown only in FIG. 4) may extend from generator bus bars 17 to breaker bus bars 34, and from breaker bus bars 34 to customer bus bars 30.

In one embodiment, first housing piece 20 may be generally L-shaped. Specifically, first housing piece 20 may include a first end 38 and a generally co-planar second end 40 oriented about 90° from first end 38. Customer connection 24 may be housed within first end 38, while breakers 32 may be housed within second end 40. Opening 26 may be located within a side of first housing piece 20 opposite second end 40. First and second ends 38, 40 may include panels (not shown) that can be selectively removed to provide access to customer connection 24 and breakers 32, if desired.

Figure 3:
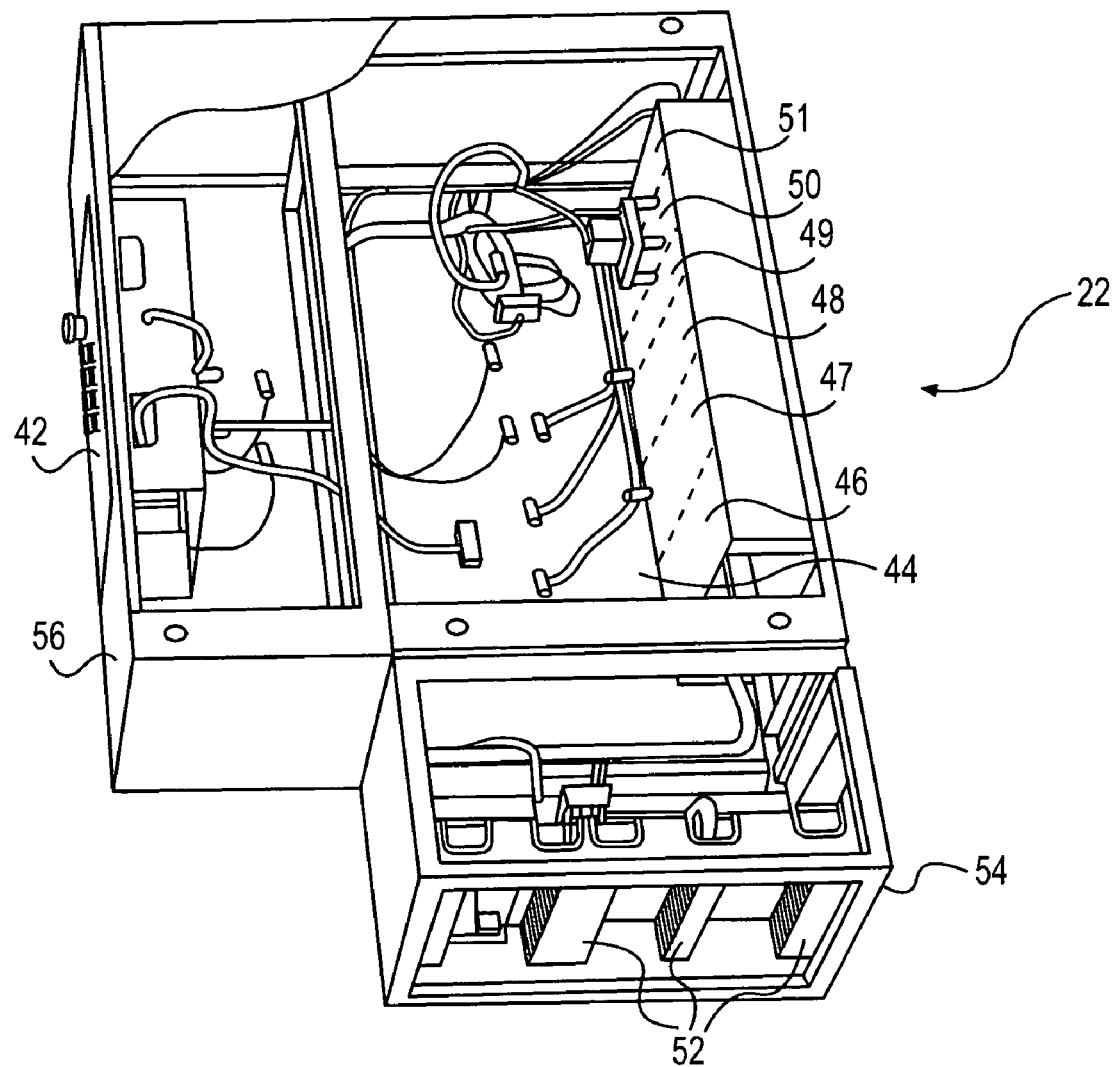
FIG. 3 is a pictorial illustration of an exemplary disclosed terminal box piece that may be used with the generator set of FIG. 1.

As shown in FIG. 3, second housing piece 22 may embody a generally open structural member configured to provide a user interface for genset 10 and house control components. That is, second housing piece 22 may include a control panel 42 at one side to provide for manual control over genset 10, and an assembly access opening 44 at an adjacent side that mates against first housing piece 20 during assembly. In one embodiment, the control components may include, for example, a digital voltage regulator 46, one or more announciators 47, a remote temperature detector 48, a remote communications device 49, one or more terminal strips 52, an electronic governor 51, a load sharing module 50, and other similar components. Digital voltage regulator 46 may be configured to monitor characteristics of electrical power produced by genset 10. Announciators 47 may embody alarm modules triggered by the monitored characteristics to alert an operator of an abnormality. Remote temperature detector (RTD) 48 may be a sensing component used to measure a temperature of a heating zone within generator 14 by correlating a measured resistance of itself with a known temperature value. Remote communications device 49 may be used to communicate monitored genset and/or prime mover performance. Terminal strips 52 may provide for necessary electrical connections between the various components of second housing piece 22. Electronic governor 51 may be configured to regulate a speed and/or load of prime mover 12 in response to an output of generator 14. Load sharing module 50 may be configured to adjust a load on generator 14 in response to a customer load demand.

In one embodiment, second housing piece 22 may be generally L-shaped. In particular, second housing piece 22 may have a substantially identical shape as first housing piece 20, with a first end 54 and a generally co-planar second end 56 oriented about 90° from first end 54. Terminal strips 52 may be housed within first end 54, while control panel 42 may be housed within second end 56. First and second ends 54, 56 may each include a panel (not shown) that can be selectively removed to provide access to terminal strips 52 and control panel 42, if desired.

Figure 4:
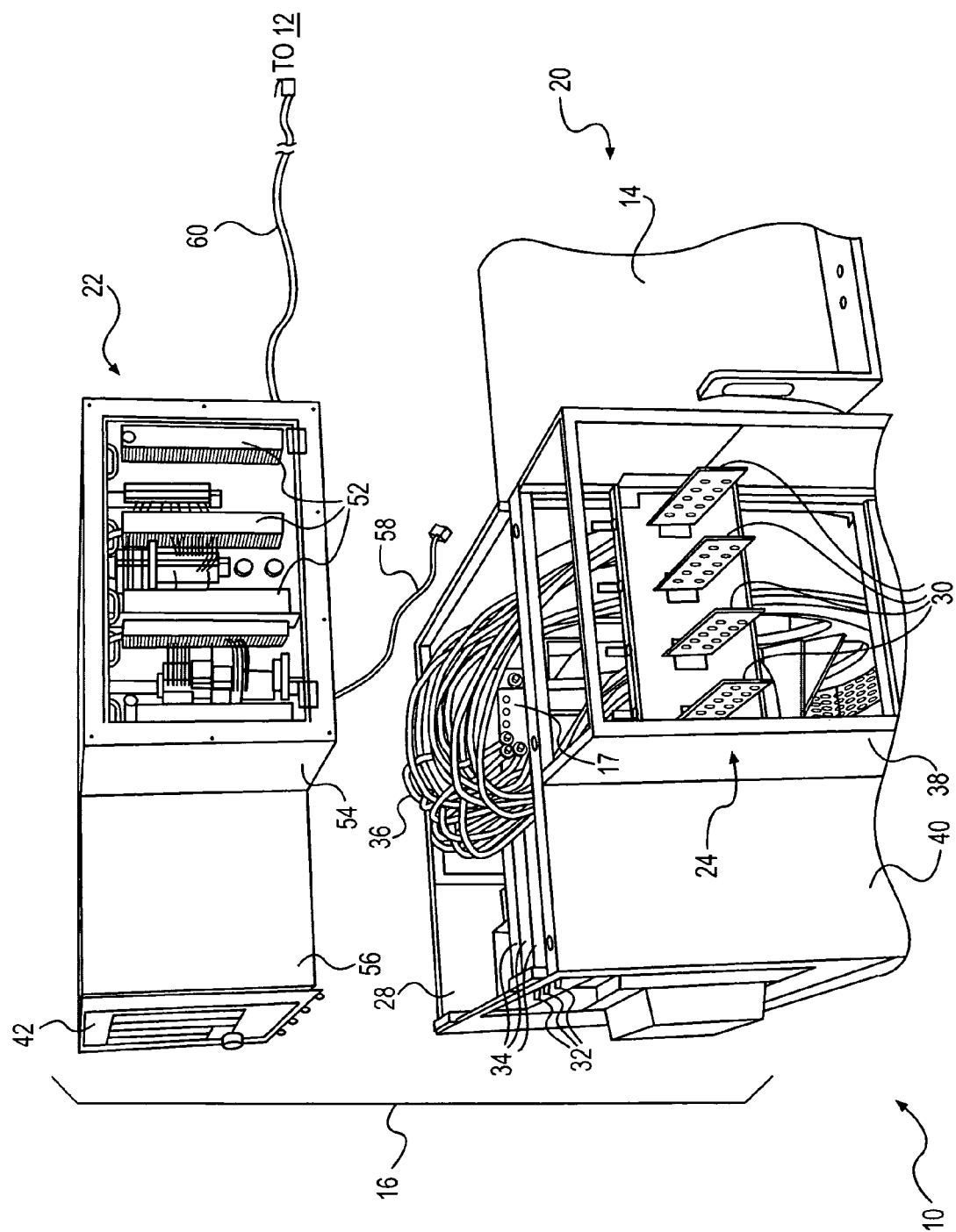
FIG. 4 is an exploded view of an exemplary disclosed terminal box that may be used with the generator set of FIG. 1.

As shown in FIG. 4, second housing piece 22 may be stacked on top of first housing piece 20 during assembly (i.e., second housing piece 22 may be vertically higher, with respect to gravity, than first housing piece 20 when terminal box 16 is fully assembled to rails 18). After cables 36 have been connected between generator 14 and the appropriate ones of bus bars 17, 30, 34, a single communications cable 58 may be connected between the components of first housing piece 20 and the components of second housing piece 22, prior to the mounting and securing of second housing piece 22 to first housing piece 20. After assembly of terminal box 16 to rails 18 and of prime mover 12 to rails 18, a single communications cable 60 may be connected between the components of terminal box 16 and prime mover 12.

INDUSTRIAL APPLICABILITY

The disclosed terminal box may be implemented into any power system application. For example, although particularly suited for a genset application, the disclosed terminal box may be utilized in conjunction with any application requiring separate housing for electrical connection components and control components. The disclosed terminal box may facilitate manufacture of the genset by providing pre-assembly of critical components and assembly access for required electrical connections between the critical components.

It will be apparent to those skilled in the art that various modifications and variations can be made to the disclosed generator set. Other embodiments will be apparent to those skilled in the art from consideration of the specification and practice of the disclosed generator set. It is intended that the specification and examples be considered as exemplary only, with a true scope being indicated by the following claims and their equivalents.

What is claimed is:

1. A terminal box for a generator set, comprising:
a customer connection;
a first housing piece configured to be mounted proximate a generator of the generator set;
at least one cable housed within the first housing piece to electrically connect the generator with the customer connection;
a second housing piece mounted to the first housing piece distal the generator; and at least one control component housed within the second housing piece to regulate a characteristic of electrical power produced by the generator set.

2. The terminal box of claim 1, wherein the customer connection is mounted to the first housing piece.

3. The terminal box of claim 1, further including:
a breaker housed within the first housing piece; and
at least a second cable housed within the first housing piece to electrically connect the generator to the breaker, wherein the at least a first cable electrically connects the breaker to the customer connection.

4. The terminal box of claim 1, wherein the first housing piece includes an opening configured to receive at least an end of the generator.

5. The terminal box of claim 1, wherein the customer connection includes at least one bus bar.

6. The terminal box of claim 1, wherein at least one of the first and second housing pieces has an L-shape.

7. The terminal box of claim 1, wherein a shape of the first housing piece substantially matches a shape of the second housing piece.

8. The terminal box of claim 1, further including a control panel mounted to the second housing piece.

9. The terminal box of claim 1, further including a voltage regulator housed within the second housing piece.

10. The terminal box of claim 1, further including at least one of an announciator, a communication device, a temperature detector, a load-share module, and an electric governor housed within the second housing piece.

11. The terminal box of claim 1, wherein at least one bus bar is associated with the generator, and the first housing piece is configured to house the at least one bus bar.

12. The terminal box of claim 1, wherein the first housing piece includes an assembly access opening substantially blocked by the second housing piece when the terminal box is assembled.

13. The terminal box of claim 1, wherein the second housing piece is located gravitationally higher than the first housing piece when the terminal box is mounted to the generator set.

14. The terminal box of claim 1, further including a single cable extending from the first housing piece to the second housing piece.

15. A method of assembling a generator set, comprising:
mounting a first housing piece proximate a generator;
electrically connecting the generator to a customer connection within the first housing piece;
mounting a second housing piece to the first housing piece after the step of electrically connecting; and
electrically connecting a control component within the second housing piece to a component within the first housing piece.

16. The method of claim 15, wherein mounting the first housing piece includes receiving at least a portion of the generator within the first housing piece.

17. The method of claim 15, wherein electrically connecting the generator to the customer connection includes electrically connecting the generator to a breaker, and electrically connecting the breaker to the customer connection.

18. The method of claim 15, wherein mounting a second housing piece to the first housing piece includes placing the second housing piece on top of the first housing piece and securing the first housing piece to the second housing piece.

19. The method of claim 15, wherein the step of electrically connecting the control component within the second housing piece to the component within the first housing piece is completed before the step of mounting the second housing piece to the first housing piece.

20. A generator set, comprising:
a prime mover;
a generator configured to be driven by the prime mover to create electrical power;
an anchor platform connecting the prime mover to the generator;
a customer connection; and
a terminal box configured to transmit the electrical power to the customer connection and to regulate the creation of electrical power, the terminal box including:
a first housing piece operatively mounted to the anchor platform;
a breaker housed within the first housing piece;
at least a first cable housed within the first housing piece to electrically connect the generator with the breaker;
at least a second cable housed within the first housing piece to electrically connect the breaker with the customer connection;
a second housing piece mounted to the first housing piece; and
at least one control component housed within the second housing piece and being configured to regulate a characteristic of electrical power produced by the generator.

* * * * *